United States Patent Office 3,661,928
Patented May 9, 1972

---

3,661,928
HALOGENATED DI- AND TRI-ARYL-PYRAZOLINE SULPHONIC ACIDS
Siegfried Rosenberger, Graubunden, and Heinrich Häusermann, Riehen, Switzerland, assignors to Ciba-Geigy Corporation, Ardsley, N.Y.
No Drawing. Filed Nov. 16, 1967, Ser. No. 683,486
Claims priority, application Switzerland, Nov. 21, 1966, 16,668/66
Int. Cl. C07d 49/10
U.S. Cl. 260—310 D                2 Claims

---

ABSTRACT OF THE DISCLOSURE

Novel halogenated 1,3-diaryl- and 1,3,5-triaryl-pyrazolines which bear a sulfonic acid group in p-position and a single fluorine, chlorine or bromine atom, in m-position, at the phenyl-substituent in 1-position at the pyrazoline nucleus are described as useful for the optical brightening of polyamide fiber materials on which they cause unexpectedly no greenish or undesirably strong reddish hue even when applied in larger concentrations, e.g. of up to 1% of pyrazoline derivative.

---

DESCRIPTION OF THE INVENTION

The present invention concerns halogenated di- and tri-aryl-pyrazoline sulphonic acids, a process for their production, their use for the optical brightening of polyamide fibre material as well as, as industrial product, the polyamide fibre material having a content of halogenated di- and tri-aryl-pyrazoline sulphonic acids according to the invention.

Numerous 1,3-diaryl- and 1,3,5-triary-pyrazolines have been suggested as brighteners for the optical brightening of organic substrates of all types. For application in aqueous liquor, certain pyrazoline sulphonic acids are used, e.g. as described in German Pat. No. 966,411 and French Pat. No. 1,093,063. The brighteners described in these patents, however, have disadvantages; they either have a green fluorescence which, when larger amounts are used, leads to an undesirable discolouration of the fibre material treated, or their fluorescence is so weak that the effect attained represents only an increase in the degree of whiteness, especially of nylon which is nowadays considered unsatisfactory. This is especially true for the known 1 - (4' - sulfo-2',5'-dichloro-phenyl)-3,5-diphenyl-pyraoline.

It has now been found that halogenated pyrazoline sulphonic acids of the general Formula I

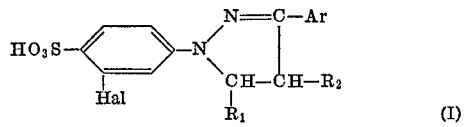

surprisingly do not have the disadvantages mentioned above and that, even used in larger amounts, they have a brilliant neutral brightening effect, i.e. neither too greenish nor too reddish, on polyamide fibre materials treated therewith.

In Formula I:

Hal represents fluorine, chlorine or bromine, $R_1$ represents hydrogen, an alkyl, aralkyl or carbocyclic aromatic radical, which latter can be substituted e.g. by halogen or alkyl groups, or it represents a heterocyclic aromatic radical, $R_2$ represents hydrogen or a lower alkyl group, and Ar represents a carbo aromatic radical which can be substituted by halogen, alkyl groups, non-colouring acylamino and especially lower alkanoylamino groups, or alkoxycarbonylamino groups, or it represents a heterocyclic aromatic radical, or Ar and $R_2$ together with the carbon atoms to which they are bound form a ring system.

If $R_1$ or $R_2$ represents an alkyl group, then this has, preferably, 1 to 4 carbon atoms. As aralkyl radical, $R_1$ is, e.g. the benzyl group.

As carbocyclic aromatic radical, $R_1$ and Ar preferably represent an optionally substituted phenyl radical; as heterocylic aromatic radical they present, e.g. the furyl or thienyl radical. Ar and $R_2$ together with the carbon atoms to which they are bound can also form a ring system, $R_2$ representing, for example, the bridging member

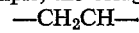

A suitable class of compounds of Formula I is of the formula above wherein

Hal represents fluorine, chlorine or bromine, $R_1$ represents lower alkyl, benzyl, furyl, thienyl, phenyl, dihalogen, substituted phenyl or hydrogen, Ar represents phenyl, $R_2$ represents —CH$_2$—CH$_2$—, Ar and $R_2$ are linked together wherein $R_2$ bridges the carbon atom in 4-position of the pyrazoline nucleus and carbon atom in 2-position of Ar or the alkali metal salts thereof.

In particularly valuable optical brighteners of Formula I Hal represents chlorine, $R_1$ represents hydrogen or the phenyl radical, $R_2$ represents hydrogen and Ar represents the phenyl or the 4-chlorophenyl radical.

Pyrazoline sulphonic acids of Formula I can actually be produced by two methods, either by converting corresponding halogenophenyl hydrazine sulphonic acids by the usual methods into the pyrazolines, or by treating 1-(3-halogenophenyl)-pyrazolines containing no sulphonic acid groups with sulphonating agents. However, the 3-halogenophenyl-hydrazine - 4 - sulphonic acids necessary for the synthesis of pyrazolines of Formula I are difficultly accessible technically, so that in this case it is better to introduce the sulphonic acid group subsequently. According to the literature, a relatively large excess or high concentrations of sulphonating agent, which also serves as solvent, are necessary for this. This known method always leads to larger amounts of coloured side products and to polysulphonic acids and, in addition, great amounts of alkalies are necessary to neutralise the excess sulphonating agent, a circumstance which has a serious effect on the economy of this sulphonating process.

Surprisingly, it has now been found that, apart from the above methods, halogenated di- and tri-aryl-pyrazoline sulphonic acids of Formula I of great purity are obtained in excellent yields in a simple manner when a compound of Formula II

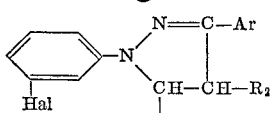

(II)

wherein Hal, $R_1$, $R_2$ and Ar have the meanings given in Formula I, is reacted with 1 to 5 times the molar amount of halogen sulphonic acid, the reaction being performed in the presence of a solvent which is inert under the reaction conditions and, optionally, while heating, in particular at 0–80° C.

The monosulphonic acids obtained are distinguished by their great purity. Their alkali metal salts are yellowish water soluble powders which have a blueish fluorescence in aqueous solution.

The pyrazolines of Formula II used as starting materials are obtained by known methods such as are described in Belgian Pat. No. 664,574.

Principally chlorosulphonic acid is useful as halogen sulphonic acid. The amount of halogen sulphonic acid is preferable 1.5 to 2.5 mols per mol of pyrazoline compound of Formula II.

Preferably the sulphonation is performed at a slightly raised temperature, e.g. at 30–60° C.

Examples of solvents which can be used are open chain, aliphatic ethers such as diethyl ether, optionally halogenated aromatic hydrocarbons such as benzene, toluene, xylene, chlorobenzene, halogenated aliphatic hydrocarbons e.g. carbon tetrachloride, chloroform or tetrachloroethane.

It could not have been foreseen from the previously known process for sulphonating aryl-pyrazolines that the sulphonation reaction would proceed so easily under such mild conditions so that, even in aromatic solvents such as in chlorobenzene, sulphonation could be performed.

The new pyrazoline sulphonic acids of Formula I can be applied to natural or synthetic polyamide fibres such as wool and nylon both from an aqueous, neutral to acid bath, optionally in combination with chemical bleaches such as hydrosulphites, or, however, they can be worked into spinning masses, e.g. those consisting of synthetic polyamide such as nylon. Preferably 0.01 to 1.0% of optical brightener are used, calculated on the substrate to be brightened.

The following examples illustrate the invention. The temperatures are given therein in degrees centigrade.

EXAMPLE 1

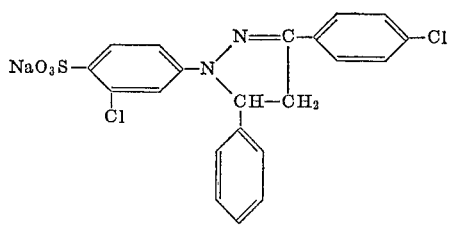

29.4 g. of 1 - (3' - chlorophenyl) - 3 - (4'' - chlorophenyl) - 5 - phenyl-pyrazoline are dissolved in 160 ml. of chlorobenzene at 50° and the solution is slowly cooled while stirring. As soon as the temperature of the solution has sunk to 30°, 18.7 g. of chlorosulphonic acid are added dropwise within 10 minutes, the temperature of the reaction mixture being kept at 20–30° by external cooling. The reaction mixture is then heated for 1 hour at 60° while stirring whereby a yellow-brown syrup separates. The reaction mixture is then cooled to 0–10°, a mixture of 160 g. of water and ice is carefully added and the pH is adjusted to 8–9 with 30–35 ml. of 10 N sodium hydroxide solution. The whole of the chlorobenzene is then azeotropically distilled off with water and the volume of liquid distilled off is continuously replaced by water so that the volume of the reaction mixture is always 300 ml. On cooling, the optical brightener crystallises into ochre coloured platelets. The substance is filtered off, well pressed down on the filter and dried at about 80°. 37 g. of the sodium salt of 1 - (3' - chlorophenyl) - 3 - (4'' - chlorophenyl) - 5 - phenyl - pyrazoline-4'-sulphonic acid are obtained. It contains about 10% of crystal water, i.e. the yield is about 90% of the theoretical. The substance decomposes at about 210°.

On dyeing in an acid bath, the preparations gives chemically bleached wool a pure white appearance.

If instead of 29.4 g. of 1-(3'-chlorophenyl)-3-(4''-chlorophenyl)-5-phenyl-pyrazoline, equivalent amounts of the pyrazolines given in the following table are used and otherwise the procedure given in Example 1 is followed, then the corresponding sodium salts of sulphonic acids are obtained the decomposition points of which are given in column V.

TABLE

General formula

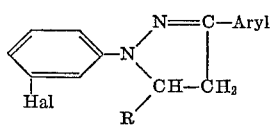

| Example | Hal | Aryl | R | Decomposition point, °C. |
|---|---|---|---|---|
| 2 | Cl | —⌬—Cl | H | >250 |
| 3 | Cl | —⌬ | H | >250 |
| 4 | Cl | —⌬(Cl)—Cl | —⌬ | ~190 |
| 5 | Cl | —⌬—Cl | —⌬—Cl | ~210 |
| 6 | Cl | —⌬—Cl | —C(O—CH=CH—CH) | ~180 |
| 7 | Cl | —⌬ | —⌬ | ~190 |

TABLE—Continued

| Example | Hal | Aryl | R | Decomposition point, °C |
|---|---|---|---|---|
| 8 | Cl | –C₆H₄–F | –C₆H₅ | ~190 |
| 9 | Br | –C₆H₄–Cl | H | ~200 |
| 10 | F | –C₆H₄–Cl | H | ~210 |
| 11 | Cl | –C₆H₃(CH₃)(CH₃)– | H | ~220 |
| 12 | Cl | –C₆H₄–CH₃ | H | ~205 |
| 13 | Cl | thienyl (–C(S–CH=CH–CH)=) | H | ~205 |
| 14 | Cl | –C₆H₄–NHCOOC₂H₅ | H | ~185 |
| 15 | Cl | –C₆H₄–Cl (ortho) | H | ~205 |
| 16 | Cl | –C₆H₄–Cl (meta) | H | ~195 |
| 17 | Cl | –C₆H₄–Cl | –CH₃ | ~240 |
| 18 | Cl | –C₆H₄–Cl | –C₆H₃(Cl)(Cl) | ~200 |
| 19 | Cl | –C₆H₄–Cl | –C₆H₃(Cl)(Cl) | ~205 |
| 20 | Cl | –C₆H₃(CH₃)(CH₃)– | –C₆H₅ | ~205 |
| 21 | Cl | –C₆H₄–CH₃ | –C₆H₅ | ~190 |
| 22 | Cl | –C₆H₄–Br | –C₆H₅ | ~190 |

EXAMPLE 23 m - Chlorophenyl hydrazine and 2 - dimethylamino-methyl-1-tetralone are reacted to yield

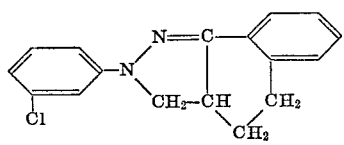

having a melting point of 86–88° C. and decomposing about 175° C.

EXAMPLE 24

300 g. of caprolactam, 300 mg. of sebacic acid and 150 mg. of brightener according to Example 2 in 50 ml. of TiO₂ (Anatas) suspension in water, containing 1.2 g. of TiO₂, are mixed at 80–90° in a water bath. The inside of a 1 litre autoclave is made free of oxygen by repeated rinsing with nitrogen and then this mixture is placed therein and the temperature is raised to 240° within 30 minutes, the pressure being 20–25 excess atm. The pressure is then so reduced within 30 minutes that the temperature remains constant. Thereafter, the polymerisation is completed within 16 hours at 250–255° under atmospheric pressure and exclusion of oxygen.

The nylon melt obtained is spun under nitrogen pressure into a fibre, the fibre is drawn and washed with warm water. The fibre obtained has a considerably more white appearance in daylight than one not treated with the brightener.

If in this process, the 150 mg. of brightener according to Example 2 are replaced by the same amount of brightener according to Example 3 and otherwise the procedure given is followed, then a similarly beautifully brightened nylon fibre is obtained.

EXAMPLE 25

Wool yarn bleached in the usual way with hydrogen peroxide is brightened as follows: 10 g. of previously bleached wool yarn are introduced into 400 ml. of 20° warm water containing 1.2 g. of hydrosulphite (stabilised with Na-phosphate) and 25 mg. of the optical brightener of the formula

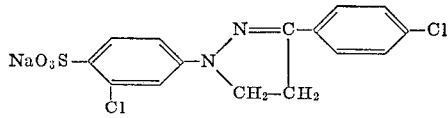

The bat is then heated to 60° and the yarn is left in the bath for 60 minutes at this temperature. It is then rinsed with cold water and dried. Compared with untreated yarn, that so treated has a beautiful, white, brilliant appearance.

EXAMPLE 26

10 g. of previously bleached wool yarn are introduced at 20° into a brightening liquor which contains 1.2 g. of hydrosulphite (stabilised with Na-phosphate) and 10 mg. of the optical brightener of the formula

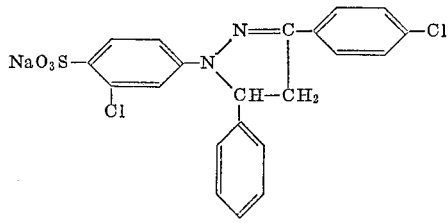

in 400 ml. of water. The bath is heated to 60° and kept for 60 minutes at this temperature. The yarn is then taken out, rinsed with cold water and dried. Compared with untreated yarn, that so treated has a beautiful, white, brilliant appearance.

EXAMPLE 27

10 g. of previously bleached wool yarn are introduced at 20° into a liquor which contains 1.2 g. of hydrosulphite (stabilised with Na-phosphate) and 50 mg. of the optical brightener of the formula

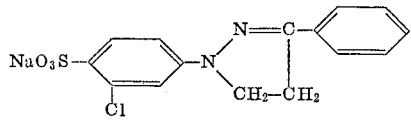

in 400 ml. of water. The bath is heated to 60° within 10 minutes and the wool yarn is left for 60 minutes in this bath, after which it is rinsed with cold water and dried. Compared with untreated yarn, that so treated has a beautiful, white, brilliant appearance.

EXAMPLE 28

10 g. of wool yarn previously bleached with hydrogen peroxide are introduced into a liquor which contains 1.2 g. of hydrosulphite (stabilised with Na-phosphate) and a mixture of brighteners consisting of 16 mg.

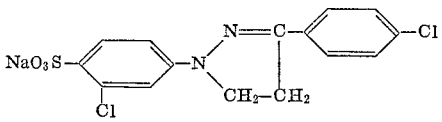

and 32 mg.

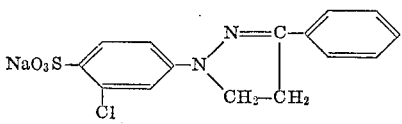

in 400 ml. of water. The bath is then heated to 60° and kept at this temperature for 60 minutes. The wool yarn is then taken out, rinsed with cold water and dried. Compared with untreated yarn, that so treated has a white, brilliant appearance. Compared with the brightening obtained by the individual components, it has a better shade.

EXAMPLE 29

10 g. of nylon staple fibre fabric are introduced at 92° into an aqueous liquor which contains 1.2 ml. of 100% formic acid and 0.6 g. of a dispersing agent and 10 mg. of the optical brightener of the formula

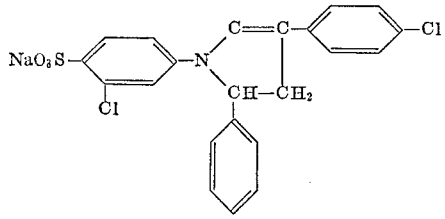

in 300 ml. of water. The fabric is left for 30 minutes in the liquor, then rinsed and dried. A beautiful, strongly brightened fabric is obtained. Similar effects are also obtained without the addition of formic acid.

If, with the above procedure, the brightener according to Example 2 or 3 is used, then similarly good brightening effects are obtained.

We claim:
1. A compound of the formula:

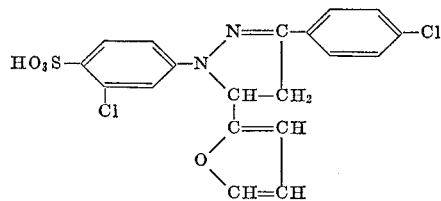

2. A compound of the formula:

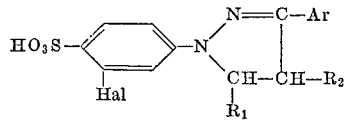

wherein
Hal represents fluorine, chlorine or bromine,
$R_1$ represents lower alkyl, benzyl, furyl, thienyl, phenyl, dihalogen substituted phenyl or hydrogen,
Ar represents phenyl,
$R_2$ represents —$CH_2$—$CH_2$—,
Ar and $R_2$ are linked together wherein $R_2$ bridges the carbon atom in 4-position of the pyrazoline nucleus and the carbon atom in 2-position of Ar or the alkali metal salts thereof.

References Cited

UNITED STATES PATENTS

| | | | |
|---|---|---|---|
| 2,639,990 | 5/1953 | Kendall et al. | 260—310 D |
| 2,740,793 | 4/1956 | Kendall et al. | 260—310 D |
| 3,357,988 | 12/1967 | Hausermann et al. | 260—310 D |
| 2,640,056 | 5/1953 | Kendall et al. | 260—310 D |

OTHER REFERENCES

Noller: Chemistry of Organic Compounds, 2nd ed., pp. 287 and 470, Philadelphia, Saunders, 1958.

Netherlands application 6506722, November 1965, 260—310 D, 3 pages of drawings and 23 pages of specification.

NATALIE TROUSOF, Primary Examiner

U.S. Cl. X.R.

117—33.5; 252—301.2 W, 301.3 W